(12) United States Patent
Roll et al.

(10) Patent No.: US 12,314,680 B1
(45) Date of Patent: May 27, 2025

(54) SYSTEMS AND METHODS FOR MULTILINGUAL DATA PROCESSING AND ARRANGEMENT ON A MULTILINGUAL USER INTERFACE

(71) Applicant: Veeva Systems Inc., Pleasanton, CA (US)

(72) Inventors: Asaf Roll, Richmond Hill (CA); Ying Zhuo Wang, Toronto (CA); Florian Emmanuel Bernard Gilbert Letourneux, Rennes (FR); Zhen Tan, North York (CA); Piotr Kuchnio, Toronto (CA)

(73) Assignee: Veeva Systems Inc., Pleasanton, CA (US)

( * ) Notice: Subject to any disclaimer, the term of this patent is extended or adjusted under 35 U.S.C. 154(b) by 232 days.

(21) Appl. No.: 17/455,849

(22) Filed: Nov. 19, 2021

(51) Int. Cl.
*G06F 40/58* (2020.01)

(52) U.S. Cl.
CPC ................... *G06F 40/58* (2020.01)

(58) Field of Classification Search
CPC ..................................................... G06F 40/58
See application file for complete search history.

(56) References Cited

U.S. PATENT DOCUMENTS

| | | | | |
|---|---|---|---|---|
| 8,108,203 B2 * | 1/2012 | Takano | ................... | G06F 40/47 704/7 |
| 11,487,955 B2 * | 11/2022 | Shin | ................... | G06F 40/166 |
| 2008/0294455 A1 * | 11/2008 | Bharara | ................ | G16H 40/67 705/2 |

FOREIGN PATENT DOCUMENTS

| | | | | |
|---|---|---|---|---|
| JP | 7513254 | * | 6/2020 | ............. G16H 70/40 |
| WO | 2021256335 A1 | | 12/2021 | |

OTHER PUBLICATIONS

Australian Government Department of Health and Aged Care, Oct. 18, 2019, E2B reports: frequently asked questions, Therapeutic Goods Administration, Entire Text (Year: 2019).*
Australian Department of Health and Aged Care, Oct. 18, 2019, E2B reports: frequently asked questions, Therapeutic goods Administration, Entire Text (Year: 2019).*
Oracle Argus Safety, User's Guide, Release 8.1.2, E93471-01, Feb. 2018.
Oracle, "Oracle Argus Safety—User Guide" Oct. 2020, Release 8.2.2, 206 pages printed (Year: 2020).

(Continued)

*Primary Examiner* — Hai Phan
*Assistant Examiner* — Ian Scott McLean

(57) ABSTRACT

A method for generating a first case dataset in a first language. The method includes receiving adverse event data. The method further includes determining case data including general case data and regional case data and providing the case data to a translator computing device to enable display on a user interface including multiple duolingual text fields with a first language text field including at least a portion of the text data in the first language and a second language text field adjacent the first language text field. The method further includes receiving the text data in the second language from a translator computing device. The text data in the second language is received via the second language text fields of the plurality of duolingual text fields. The method further includes generating and outputting the first case dataset including the text data in the first language.

20 Claims, 7 Drawing Sheets

(56) References Cited

OTHER PUBLICATIONS

Extending A Worldwide Pharmacovigilance Program Into The Japanese Market, Manual, Aris Global, 2010.
Oracle's Argus Safety Japan: A Single Global Database For World-Wide Pharmacovigilance, Manual, Oracle Health Sciences, 2010.

* cited by examiner

SYSTEMS AND METHODS FOR MULTILINGUAL DATA PROCESSING AND ARRANGEMENT ON A MULTILINGUAL USER INTERFACE

TECHNICAL FIELD

The present disclosure relates to systems and methods for multilingual data processing and arrangement on a multilingual user interface.

BACKGROUND

Researchers, scientists, industry players, academics, government regulators, and other stakeholders are increasingly in need of efficient ways to intake and generate individual case safety reports (ICSRs) in a local language and generate cases around the globe in alternative languages.

SUMMARY

One embodiment relates to a method for generating a first case dataset in a first language in a multilingual data processing system, the multilingual data processing system includes a provider computing system and a translator computing device connected by a secure network. The method includes receiving adverse event data associated with one or more adverse events and a request to generate the first case dataset. The request includes case localization data. The method further includes determining case data including general case data and regional case data based on the adverse event data and the case localization data, the general case data including text data in the first language and multiple field codes. The method further providing the case data to the translator computing device to enable display on a user interface. The user interface includes multiple duolingual text fields, each duolingual text field comprising a first language text field including at least a portion of the text data in the first language and a second language text field adjacent the first language text field. The method further includes receiving the text data in the second language from the translator computing device. The text data in the second language is received via the second language text fields of the multiple of duolingual text fields. The method further includes generating the first case dataset including the regional case data, the text data in the first language in the first language, and the multiple field codes and outputting the first case dataset.

Another embodiment relates to a method for generating a first case dataset in a first language in a multilingual data processing system, the multilingual data processing system includes a provider computing system and a user computing device connected by a secure network. The method includes receiving adverse event data associated with one or more adverse events. The method further includes receiving a request to generate the first case dataset. The method further includes determining general case data based on the adverse event data, the general case data including text data in the first language and multiple field codes. The method further includes providing the general case data to the user computing device to enable display on a user interface. The user interface includes multiple duolingual text fields, each duolingual text field comprising a first language text field including at least a portion of the text data in the first language and a second language text field adjacent the first language text field. The method further includes receiving the text data in the second language from the user computing device. The text data in the second language is received via the second language text fields of the multiple of duolingual text fields. The method further includes generating the first case dataset including the regional case data, the text data in the first language, and the multiple field codes and outputting the first case dataset.

Another embodiment relates to a method for generating a first case dataset in a first language in a multilingual data processing system, the multilingual data processing system includes a provider computing system and a user computing device connected by a secure network. The method includes receiving adverse event data associated with one or more adverse events. The method further includes receiving case localization data from the user computing device. The method further includes receiving a request to generate the first case dataset. The method further includes determining general case data based on the adverse event data, the general case data including text data in the first language and multiple field codes. The method further includes determining multiple regional case fields based on the case localization data. The method further includes providing the general case data and the multiple regional case fields to the user computing device to enable display on a user interface. The user interface includes a regional section including the multiple regional case fields. The method further includes receiving regional case data and the text data in the second language from the user computing device. The regional case data is received via multiple regional fields of the regional section. The method further includes generating the first case dataset including the regional case data, the text data in the first language, and the multiple field codes and outputting the first case dataset.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIGS. 3A-3C are illustrations of some aspects of a user interface generated by the multilingual data processing and arrangement system of FIG. 1 to receive and arrange multilingual case data, according to an example embodiment.

DETAILED DESCRIPTION

Figure 1:
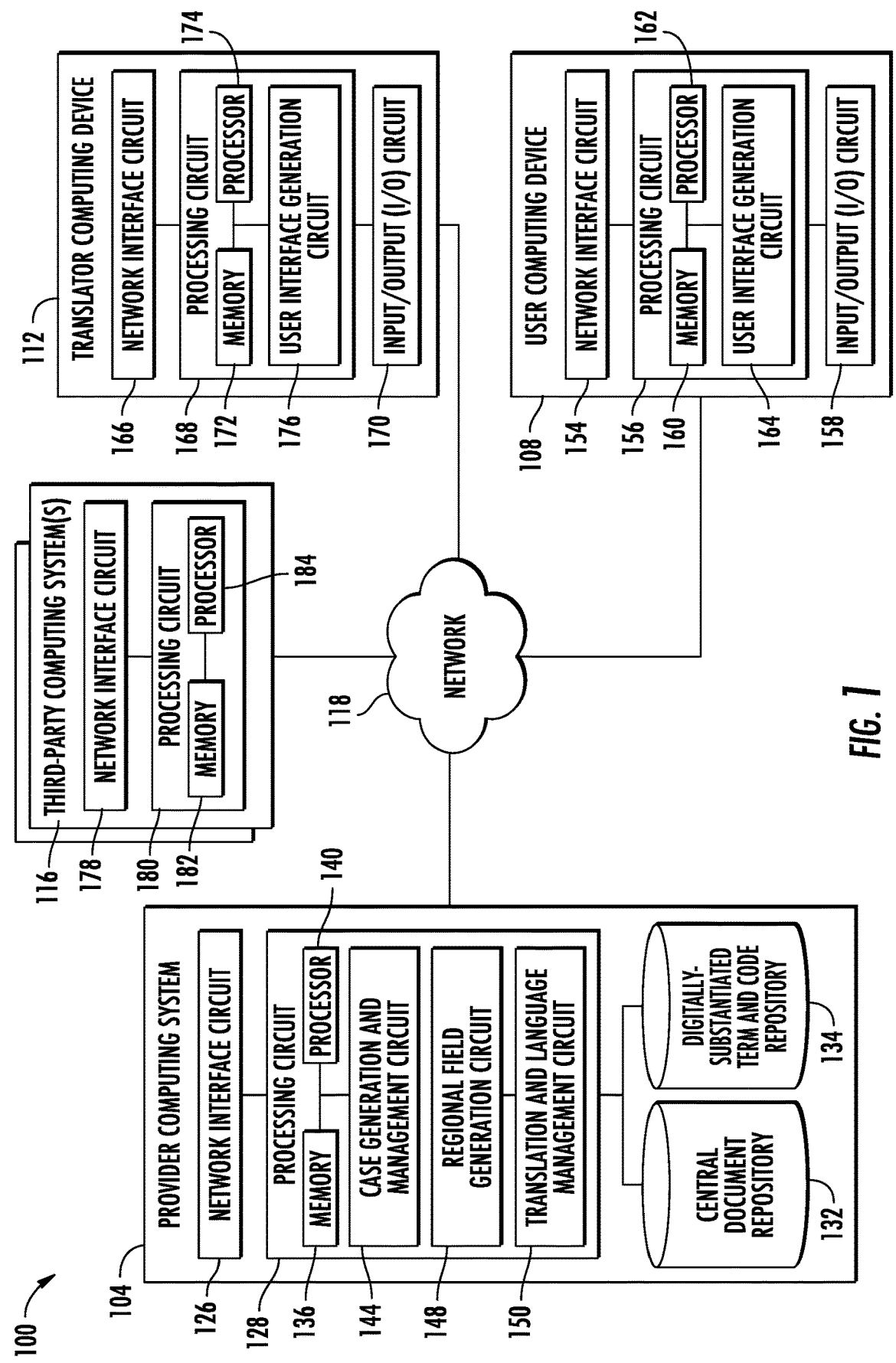
FIG. 1 is a component diagram of a multilingual data processing and arrangement system, according to an example embodiment.

Referring generally to the figures, systems and methods for multilingual data and case processing and arrangement on a multilingual user interface are disclosed. The systems and methods described herein provide for improved multilingual ICSR digital intake and case dataset generation, and thereby help the pharmaceutical industry by shortening the time required for adverse events, received in any language, to be reported to the correct health authorities. For example, the systems and methods described herein provide for multilingual intake of adverse event data and case data and generation of multiple case datasets, at a single time, based on the multilingual case data, in comparison to typical case processing in which a single case dataset, in each language, is generated and processed at a time. For example, the systems and methods described herein may receive adverse event data in a first language and determine case data in a first language and a second language, as well as any regionally-required case data. Then, the systems and methods described herein, may generate and submit a first case dataset including data in the first language to a first health authority, and generate and submit a second case dataset including data in the second language to the second health authority. By doing so, the systems and methods described herein may significantly speed up adverse event reporting and use less processing power and memory, than is typical. For example, by generating both case datasets based on substantially the same data, the systems and methods described herein may not require duplication and storage of each piece of case data, and instead only require storage of specific pieces of the case data in the first language and the second language.

Additionally, because the systems and methods described herein utilize duolingual text fields with a first language text field and a second language text field, the systems provide a technical improvement to the technical problem of multilingual data intake and processing. For example, because the user interfaces described herein include the first language text field directly adjacent the second language text field, the systems use less processing power and memory. By including the first language text field directly adjacent the second language text field, the user interface provides for centralized multilingual data intake and processing. For example, instead of the user having to access two, separate, case pages (e.g., one for the first case and one for the second case), the user interface provides an interface to enter text information in a first language and a second language, in a single location (e.g., the duolingual text field). As a result, the user of a user computing device does not have to access, edit, and flip between the two separate cases to translate the text information from the first language into the second language, which saves on processing power and memory (e.g., because the systems do not have to generate and provide the two separate case pages to the user computing device and the user computing device does not have to display the two separate cases) by the systems described herein.

In an illustrative scenario, a provider computing system may receive adverse event data associated with one or more adverse event of an associated medical product as well as a request to generate one or more case datasets. The request may include case localization data indicating or identifying one or more countries or health authorities in which or to which the case is to be submitted. Next, the provider computing system may determine general case data based on the adverse event data. The general case data may include text data in a first language and multiple field codes. Next, the provider computing system may determine multiple regional case fields based on the case localization data and provide the general case data and the multiple regional case fields to a user computing device. Next, the provider computing system may receive regional case data from the user computing device or the translator computing device. Next, the provider computing system may determine if the general case data includes a translation of the case data in a second language. If it does not, the provider computing system may receive the translation of the text data in the second language from at least one of the user computing device or a translator computing device. Next, the provider computing system may generate a first case dataset including the regional case data, the text data in the first language, and the multiple field codes and output or provide the first case to at least one of a first third-party computing system or the user computing device. Next, the provider computing system may generate a second case dataset including the translation of the text data in the second language and the field codes and output or provide the second case to at least one of a second third-party computing system or the user computing device.

As used herein, the term "event," "medical event," or "adverse event" can include any untoward medical occurrence which happens to either a patient or a subject in a clinical investigation or during regular use of a medical product that has been given to that person. For example, the "event," "medical event," or "adverse event" may encompass any signs which are unfavorable and unexpected for the patient or subject, including any abnormal laboratory findings such as a high blood pressure, a rapid heart rate, etc. The "event," "medical event," or "adverse event" could be symptoms, or a disease temporally associated with the use of a medical product and does not have to have been previously associated with that product. The term "event," "medical event," or "adverse event" can further encompass adverse reactions and serious adverse events such as death, life-threatening adverse experiences, inpatient hospitalization, congenital birth defects, disabilities, etc. Further, each "event," "medical event," or "adverse event" may be defined by the Medical Dictionary for Regulatory Activities (MedDRA) and associated with a specific MedDRA code. Moreover, "event data," "medical event data" or "adverse event data" can include data associated with the event such as the date of onset of the event, the date of cessation of the event, the type of event, the digitally-substantiated term (e.g., the MedDRA term), the associated code (e.g., MedDRA code), event comments, the outcome of the event, the location of the event (e.g., country where the event occurred), the event duration, patient data for a patient who endured or to which the event occurred, medical products that the patient consumed and/or dosages for the consumed medical products, the event rank, event contacts, the event type, and any associated event documents.

As used herein, the term "case" or "case dataset" can include an electronic Individual Case Safety Report (ICSR), as defined by the standard ISO/HL7 27953 of the International Standards Organization (ISO) as well as any past or future standards governing ICSRs of the ISO, the Food and Drug Administration (FDA), the European Medicines agency (EMA), or other national health agencies governing ICSRs. Moreover, "case data" and "general case data" can include data associated with or included in the case such as adverse event data, case contact data, case priority, case documents, patient data, and other data associated with a case as defined by the standard ISO/HL7 27953 as well as any past or future standards governing ICSRs of the ISO, the Food and Drug Administration (FDA), the European Medicines agency (EMA), or other national health agencies governing ICSRs.

Referring now to FIG. 1, a system 100 for multilingual data processing and arrangement is shown, according to an example embodiment. The system 100 includes a provider computing system 104, a user computing device 108, a translator computing device 112, and one or more third-party computing systems 116 connected by a secure network (e.g., a network 118). In some embodiments, the system 100 does not include the one or more third-party computing systems 116.

The network 118 communicably and operably couples the provider computing system 104, the user computing device 108, the translator computing device 112, and the one or more third-party computing systems 116 such that communicable and operable computing may be provided between the provider computing system 104 and the user computing device 108, the translator computing device 112, and/or the one or more third-party computing systems 116 over the network 118. In various embodiments, the network 118 includes any combination of a local area network (LAN), an intranet, the Internet, or any other suitable communications network, directly or through another interface.

The provider computing system 104 may be operated and managed by a provider (e.g., a software as a service (SaaS) provider, a cloud services provider, a software provider, a service provider, etc.) and may include a computer system (e.g., one or more servers (e.g., a cloud computing server) each with one or more processing circuits). In some embodiments, the provider computing system 104 may be a host and provide an application (e.g., a web-based application, a mobile application, etc.) to the user computing device 108 over the network 118. As shown, the provider computing system 104 may include a network interface circuit 126, a processing circuit 128, a central document repository 132, and a digitally-substantiated term and code repository 134. In some embodiments, the provider computing system 104 may include an input/output circuit (e.g., similar to or the same as an input/output circuit 158 that will be described further herein).

The network interface circuit 126 is structured to establish connections with the user computing device 108, the translator computing device 112, and/or the third-party computing systems 116 by way of the network 118. The network interface circuit 126 includes program logic and/or hardware-based components that connect the provider computing system 104 to the network 118. For example, the network interface circuit 126 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface circuit 126 includes the hardware and machine-readable media structured to support communication over multiple channels of data communication (e.g., wireless, Bluetooth, near-field communication (NFC). In some embodiments, the network interface circuit 126 includes cryptography logic and capabilities to establish a secure communications session.

In some embodiments, the network interface circuit 126 may include AS2 gateway logic which includes programmable instructions that facilitate communication (transmission and receipt) using the AS2 Gateway communication protocol (as specified in Request for Comment (RFC) 4130) over the network 118 via the network interface circuit 126. For example, using the AS2, the network interface 126 may transmit or receive files (e.g., a source file, a case, etc.) or other data to the third-party computing systems 116 using the AS2 Gateway protocol.

The processing circuit 128, as shown, comprises a memory 136, a processor 140, a case generation and management circuit 144, a regional field generation circuit 148, and a translation and language management circuit 150. The memory 136 includes one or more memory devices (e.g., RAM, NVRAM, ROM, flash memory, hard disk storage, etc.) that store data and/or computer code for facilitating the various processes described herein. That is, in operation and use, the memory 136 stores at least portions of instructions and data for execution by the processor 140 to control the processing circuit 128. The memory 136 may be or include tangible, non-transient volatile memory and/or non-volatile memory. The processor 140 may be implemented as a general-purpose processor, an application specific integrated circuit (ASIC), one or more field programmable gate array (FPGAs), a digital signal processor (DSP), a group of processing components or other suitable electronic processing components.

As described herein, the case generation and management circuit 144 is structured or configured to receive adverse event data associated with one or more specific medical products or clinical trials/studies (which may be associated or testing one or more specific medical products), determine case data based on the adverse event data, and generate a case (also referred to herein as a case dataset) including case data. For example, the case generation and management circuit 144 may receive an email or an E2B XML file including adverse event data associated with a specific medical product (e.g., drug X) or a specific clinical trial (e.g., clinical trial Y) testing a specific medical product. In response, the case generation and management circuit 144 may generate or determine case data based on the adverse event data and then generate a case including the case data. The case generation and management circuit 144 may store the case and the associated case data within the central document repository 132 and/or electronically provide or transmit the case to the one or more third-party computing systems (e.g., the FDA electronic submissions gateway).

In some embodiments, the case generation and management circuit 144 may generate the case in response to receiving a request to generate the case. The request may include case localization data which identifies one or more countries or health agencies in which the case is to be submitted (e.g., the USA or the FDA, Europe or the EMA, Japan, or the pharmaceutical and medical devices agency (PMDA), and/or multiple countries (i.e., global). In other embodiments, the case localization data may be received from the user computing device 108 separately from the request to generate the case.

The regional field generation circuit 148 is configured or structured to determine regional case data required based on the case localization data and generate one or more regional fields to determine or receive and collect the regional case data. For example, the case localization data may indicate the case is to be generated for Japan/the PMDA and, in response, the regional field generation circuit 148 may determine the regional case data is to include a PMDA reporting category, comments on the initial date for reporting, an overview of the report/case, a retrospective analysis of infections, a list of actions to be taken, and other PMDA specific reporting data. Then, on a digital representation of the case, the regional field generation circuit 148 may generate a field for each piece of regional case data and fill each field for which the provider computing system 104 has corresponding regional case data.

The translation and language management circuit 150 is structured or configured to translate specific words, terms, and fields that are to be provided to the user computing device 108 for display based on a display language of the user (e.g., a display language that is received by the provider computing system 104 from the user computing device 108) or the case localization data. For example, the translation and language management circuit 150 may translate regional field labels, drop down options, and other fields labels, of the digital representation of the case, from a first language to a second language, based on a display language of the user or the case localization data.

In some embodiments, the translation and language management circuit 150 may manage the language of the received case data and adverse event data by determining a specific language the adverse event data and case data are to be received in or translated to. For example, the translation and language management circuit 150 may determine the case is to be submitted in Japan, based on the case localization data, and determine the case data including the regional case data is to be received in the Japanese language. Further, in response to receiving the case data in a different language than the specific language (e.g., not Japanese), the translation and language management circuit 150 may provide a notification to the user computing device 108 requesting a translation of the case data or automatically translate the case data to the specific language, as will be described further herein.

The central document repository 132 is a repository (e.g., one or more databases) that is structured or configured to receive, store, and manage documents, files, and/or data object associated with the documents or files. For example, the central document repository 132 may receive newly generated cases and documents representing received adverse event data (referred to herein as inbox items). In another example, the central document repository 132 may receive the case data and/or the adverse event data and an associated data object (e.g., a case data object, an inbox item data object, etc.). For each document or data object stored within the central document repository 132, the central document repository 132 may further generate or determine version data associated with each to capture and save any changes made to the document or data object. In some embodiments, each document and/or associated data object may include medical product data identifying a specific medical product the document is associated with or clinical trial/study data identifying a specific clinical trial/study and medical product the document is associated with. In some embodiments, the central document repository 132 stores electronic documents therein and a separate data object repository (not shown) of the provider computing system 104 stores the associated data objects therein. The data objects stored in the data object repository may each include a reference pointer to the associated document stored in the central document repository 132.

The central document repository 132 can be structured according to various database types, such as, relational, hierarchical, network, flat, point-in time, and/or object relational. In some embodiments, the central document repository 132 includes a plurality of nonvolatile/non-transitory storage media such as solid-state storage media, hard disk storage media, virtual storage media, cloud-based storage drives, storage servers, and/or the like.

Likewise, the digitally-substantiated term and code repository 134 is a repository (e.g., one or more databases) that is structured or configured to receive, store, and manage digitally-substantiated terms (i.e., terms that are digitally represented) (e.g., MedDRA terms) and associated codes (e.g., MedDRA codes). For example, the digitally-substantiated term and code repository 134 may be a MedDRA term and code repository that includes each medDRA term and associated medDRA code of the MedDRA dictionary. In other embodiments, the digitally-substantiated term and code repository 134 may receive and store terms and associated codes of other medical dictionaries or classification standards such as the World Health Organization (WHO) Drug Dictionary, the International Classification of Diseases (ICD), the International Classification of Functioning (ICF), the Interactional Classification of Health Interventions (ICHI), and the like. In even other embodiments, the digitally-substantiated term and code repository 134 may receive and store terms and associated codes of user-defined dictionaries (e.g., digital dictionaries received from the user computing device 108). To do so, the digitally-substantiated term and code repository 134 can be structured according to various database types, such as, relational, hierarchical, network, flat, point-in time, and/or object relational. Further, the digitally-substantiated term and code repository 134 may be configured to manage or maintain the integrity and/or version updates of the digitally-substantiated terms and codes such that the user or an administrator does not have to upkeep the digitally-substantiated terms and codes as they change over time and/or the dictionary grows (e.g., as new MedDRA dictionaries are published). In some embodiments, the digitally-substantiated term and code repository 134 automatically provides the most current version of the digitally-substantiated terms and codes (e.g., the dictionary terms and codes) to the user (e.g., of the user computing device 108). Further, the digitally-substantiated term and code repository 134 may provide historical versions of the dictionary (e.g., the MedDRA dictionary, the WHO Drug Dictionary, the user-defined dictionary, etc.) when requested by the user. In some embodiments, the digitally-substantiated term and code repository 134 includes a plurality of nonvolatile/non-transitory storage media such as solid-state storage media, hard disk storage media, virtual storage media, cloud-based storage drives, storage servers, and/or the like.

Still referring to FIG. 1, the user computing device 108 can be or include a computing device or computing system. For instance, the user computing device 108 can be one or more of a mobile phone, a tablet computer, a laptop computer, a smart watch, a server computer system, or any other internet-connected device. In operation, the user computing device 108 may communicate and interface with the provider computing system 104 via the network 118 to generate and provide a request to generate one or more cases and transmit the cases to the respective health authorities (e.g., via the third-party computing systems 116) as well as to provide case data to the provider computing system 104. For example, the user computing device 108 may receive multiple fields, field labels, and the like for display on the user computing device 108 as a user interface. The user of the user computing device 108 may use the user interface to provide case localization data and/or case data (e.g., regional case data, reporter data, medical product data, etc.) to the provider computing system 104. Further, the user of the user computing device 108 may use the user interface to generate the request to generate and submit the case. Once the request is generated, the user computing device 108 may provide the request to the provider computing system 104. Further, in some embodiments, the user computing device 108 may provide adverse event data to the provider computing system 104 (e.g., in an E2B XML file, in an email, etc.) for generating a case. As shown, the user computing device 108 may include a network interface circuit 154, a processing circuit 156, and the input/output (I/O) circuit 158.

The network interface circuit 154 is structured to establish connections with the provider computing system 104, the translator computing device 112, and/or the third-party computing system 116 by way of the network 118. The network interface circuit 154 includes program logic and/or hardware-based components that connect the user computing device 108 to the network 118. For example, the network interface circuit 154 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface circuit 154 includes the hardware and machine-readable media structured to support communication over multiple channels of data communication (e.g., wireless, Bluetooth, near-field communication (NFC). In some embodiments, the network interface circuit 154 includes cryptography logic and capabilities to establish a secure communications session.

The processing circuit 156, as shown, comprises a memory 160, a processor 162, and a user interface generation circuit 164. The memory 160 includes one or more memory devices (e.g., RAM, NVRAM, ROM, flash memory, hard disk storage, etc.) that store data and/or computer code for facilitating the various processes described herein. That is, in operation and use, the memory 160 stores at least portions of instructions and data for execution by the processor 162 to control the processing circuit 156. The memory 160 may be or include tangible, non-transient volatile memory and/or non-volatile memory. The processor 162 may be implemented as a general-purpose processor, an application specific integrated circuit (ASIC), one or more field programmable gate array (FPGAs), a digital signal processor (DSP), a group of processing components or other suitable electronic processing components.

The user interface generation circuit 164 may be configured to receive a user interface (e.g., a web interface in an HTML file and related files, a downloaded graphical user interface, etc.) from the provider computing system 104 and render or generate the user interface on the user computing device 108 via the I/O circuit 158. In this way, the provider computing system 104 may generate one or more user interfaces and provide the one or more user interfaces to the user interface generation circuit 164 to be rendered on the user computing device 108 (e.g., on a display of the I/O circuit 158 of the user device 108).

The I/O circuit 158 is structured to receive communications from and provide communications to the user of the user computing device 108 (e.g., the user). In this regard, the I/O circuit 158 is structured to exchange data with the processing circuit 156 to provide output to the user and to receive input from the user. As a result, the I/O circuit 158 may include a display that may be manipulated by the application. In some embodiments, the I/O circuit 158 may also include a keyboard, a mouse, a joystick, a touch screen, touch areas, soft keys, a microphone, a speaker, a vibration mechanism, a sensor, a RFID scanner, or other input/output devices described herein.

In some embodiments, the user computing device 108 further includes a web application circuit (not shown) through which the user of the user computing device 108 can interface with the provider computing system 104 (e.g., access and interface with the user interfaces described herein).

Similar to the user computing device 108, the translator computing device 112 can be or include a computing device or computing system. For instance, the translator computing device 112 can be one or more of a mobile phone, a tablet computer, a laptop computer, a smart watch, a server computer system, or any other internet-connected device. In operation, the translator computing device 112 may communicate and interface with the provider computing system 104 via the network 118 to provide translations of text data of the case data to the provider computing system 104 and therefore may be operated by a translator. For example, the translator computing device 112 may receive the same fields, field labels, and the like for display on the translator computing device 112 as a user interface as the user computing device 108. Further, as will be described herein, the user interface may include multiple dual language text fields that include or represent the same text data in a first language and a second language (e.g., Japanese and English). The translator of the translator computing device 112 may access the user interface and the dual language text fields to provide a translation of the text data from the first language to the second language. Once the translation of the text data from the first language to the second language is received, the user computing device 108 may provide the case data including the text data in the first language and the second language to the provider computing system 104. As shown, the translator computing device 112 may include a network interface circuit 166, a processing circuit 168, and the input/output (I/O) circuit 170.

The network interface circuit 166 is structured to establish connections with the provider computing system 104, the user computing device 108, and/or the third-party computing system 116 by way of the network 118. The network interface circuit 166 includes program logic and/or hardware-based components that connect the translator computing device 112 to the network 118. For example, the network interface circuit 166 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface circuit 166 includes the hardware and machine-readable media structured to support communication over multiple channels of data communication (e.g., wireless, Bluetooth, near-field communication (NFC). In some embodiments, the network interface circuit 166 includes cryptography logic and capabilities to establish a secure communications session.

The processing circuit 168, as shown, comprises a memory 172, a processor 174, and a user interface generation circuit 176. The memory 172 includes one or more memory devices (e.g., RAM, NVRAM, ROM, flash memory, hard disk storage, etc.) that store data and/or computer code for facilitating the various processes described herein. That is, in operation and use, the memory 172 stores at least portions of instructions and data for execution by the processor 174 to control the processing circuit 168. The memory 172 may be or include tangible, non-transient volatile memory and/or non-volatile memory. The processor 174 may be implemented as a general-purpose processor, an application specific integrated circuit (ASIC), one or more field programmable gate array (FPGAs), a digital signal processor (DSP), a group of processing components or other suitable electronic processing components.

The user interface generation circuit 176 may be configured to receive a user interface (e.g., a web interface in an HTML file and related files, a downloaded graphical user interface, etc.) from the provider computing system 104 and render or generate the user interface on the translator computing device 112 via the I/O circuit 170. In this way, the provider computing system 104 may generate one or more user interfaces and provide the one or more user interfaces to the user interface generation circuit 176 to be rendered on the translator computing device 112 (e.g., on a display of the I/O circuit 170 of the translator computing device 112).

The I/O circuit 170 is structured to receive communications from and provide communications to the user of the user computing device 108 (e.g., the translator). In this regard, the I/O circuit 170 is structured to exchange data with the processing circuit 168 to provide output to the user and to receive input from the user. As a result, the I/O circuit 170 may include a display that may be manipulated by the application. In some embodiments, the I/O circuit 170 may also include a keyboard, a mouse, a joystick, a touch screen, touch areas, soft keys, a microphone, a speaker, a vibration mechanism, a sensor, a RFID scanner, or other input/output devices described herein.

Still referring to FIG. 1, the one or more third-party computing systems 116 are managed by a third-party (e.g., the FDA, the EHA, Health Canada) and can be or include a computing device or system configured to communicate with the provider computing system 104 over the network 118. For instance, the third-party computing systems 116 can be a server computer system, a gateway computing system, a laptop computer a desktop computer, and any other internet-connected device that can communicate over the network 118. For example, the third-party computing systems 116 may be the Electronics Submission Gateway (ESG) of the FDA through which one or more E2B XML files may be received from or provided to. In operation, the third-party computing systems 116 may communicate with the provider computing system 104 or the user computing device 116 to send and/or receive one or more source files associated with adverse events (e.g., E2B files) or one or more electronic cases (e.g., E2B XML files). As shown, the third-party computing systems 116 include a network interface circuit 178 and a processing circuit 180.

The network interface circuit 178 is structured to establish connections with the provider computing system 104, the user computing device 108, and/or the translator computing device 112 by way of the network 118. The network interface circuit 178 may be similar to the network interface circuit 126 and includes program logic (e.g., AS2 Gateway Logic as described herein) and/or hardware-based components that connect the third-party computing system 116 to the network 118. For example, the network interface circuit 178 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface circuit 178 includes the hardware and machine-readable media structured to support communication over multiple channels of data communication (e.g., wireless, Bluetooth, near-field communication (NFC). In some embodiments, the network interface circuit 178 includes cryptography logic and capabilities to establish a secure communications session.

The processing circuit 180, as shown, may include a memory 182 and a processor 184. The memory 182 includes one or more memory devices (e.g., RAM, NVRAM, ROM, flash memory, hard disk storage, etc.) that store data and/or computer code for facilitating the various processes described herein. That is, in operation and use, the memory 182 stores at least portions of instructions and data for execution by the processor 184 to control the processing circuit 180. The memory 182 may be or include tangible, non-transient volatile memory and/or non-volatile memory. The processor 184 may be implemented as a general-purpose processor, an application specific integrated circuit (ASIC), one or more field programmable gate array (FPGAs), a digital signal processor (DSP), a group of processing components or other suitable electronic processing components.

Figure 2A:
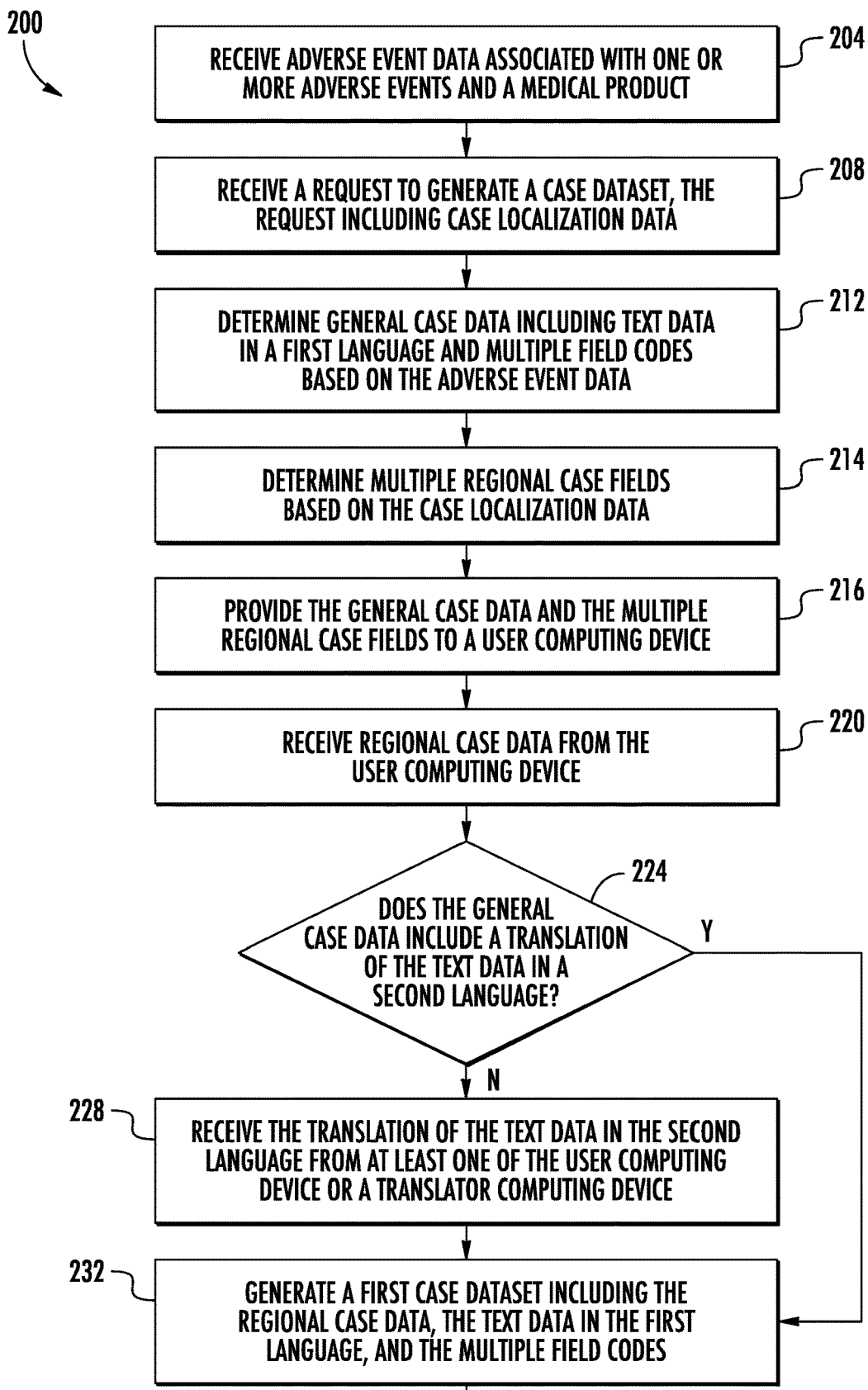
FIGS. 2A and 2B are a flow diagram of a method for processing multilingual case data and generating a first case dataset in a first language and a second case in a second language, according to an example embodiment.
Figure 2B:
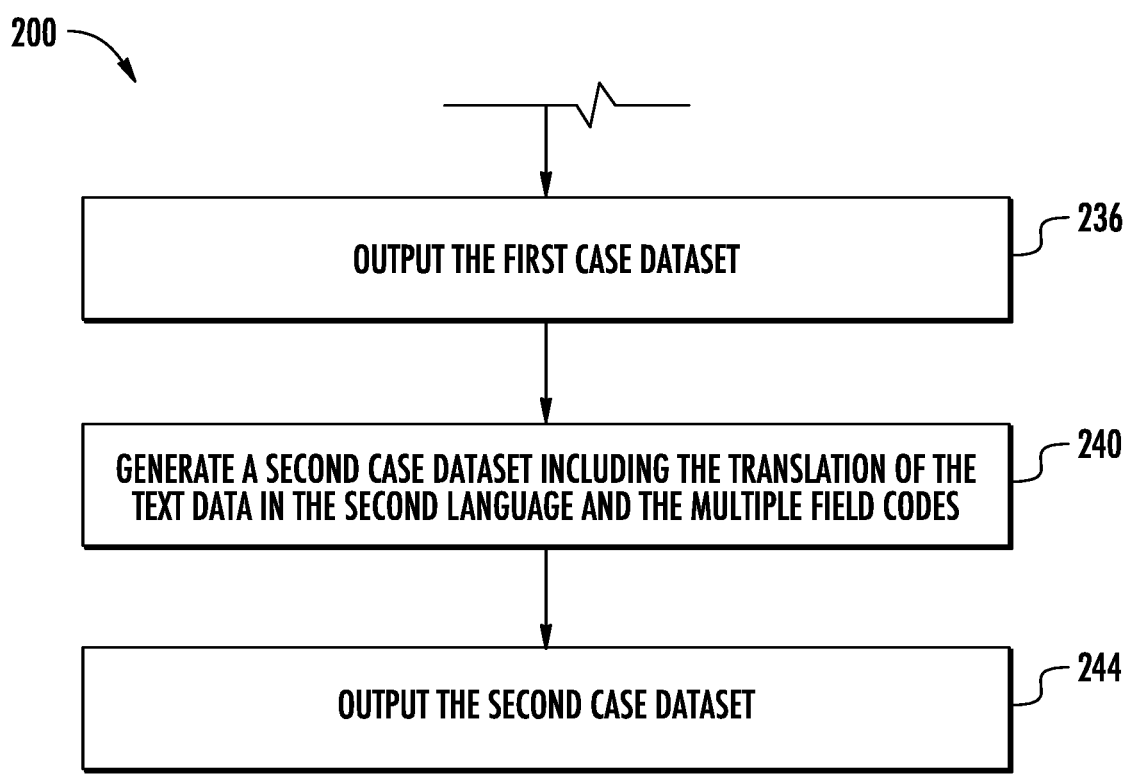

Referring now to FIGS. 2A-2B, a method 200 of processing multilingual case data and generating a first case in a first language and a second case in a second language is shown, according to an example embodiment. Method 200 can be carried out by the system 100 of FIG. 1. More particularly, the method 200 can be carried out by the processing circuit 128 of the provider computing system 104 and through communication with the user computing device 108, the translator computing device 112, and the third-party computing system 116.

Method 200 commences at step 204 at which the provider computing system 104 receives adverse event data associated with one or more adverse events of a specific associated medical product or a specific clinical trial. The adverse event data or case data may include data pertaining to the adverse event such as the date of onset of the event, the date of cessation of the event, the type of event, the event code (e.g., MedDRA code), event comments, the outcome of the event, the location of the event (e.g., country where the event occurred), the event duration, patient data for a patient who endured or to which the event occurred, medical products that the patient consumed and/or dosages for the consumed medical products, the event rank, event contacts, the event type, and/or any associated event documents. In some embodiments, the adverse event data may be received from the user computing device 108 or the one or more third-party computing systems 112 (e.g., the FDA electronic submissions gateway) in a source document (e.g., an E2B XML file, an email and email attachments, a PDF document, etc.). In some embodiments, the adverse event data is associated with one or more clinical studies or trials, and each clinical study or trial is associated with one or more medical products.

Once the provider computing system 104 has received the adverse event data, the method 200 proceeds to step 208 at which the provider computing system 104 receives a request to generate and/or submit one or more case datasets. The request may include case localization data which may include or identify one or more countries in which the case dataset is to be submitted (e.g., Japan, USA, Israel, globally, etc.). In some embodiments, the case localization data may be determined or received separately from the request to generate and submit the case dataset. For example, the case localization data may be received from the user computing device 108 prior to receiving the request to generate the case dataset. In another example, the case localization data may be received from the user computing device 108 while receiving the adverse event data from the user computing device 108 (e.g., at step 204). In other embodiments, the provider computing system 104 may determine the case localization based on the adverse event data. For example, the adverse event data may identify a country in which the adverse event occurred, and the provider computing system 104 may determine the case localization data based on the country in which the adverse event occurred (e.g., the adverse event occurred in France, so the case dataset is to be submitted in France and the USA). In some embodiments, the case localization data may be determined based on where the associated medical product is registered (e.g., the case dataset is to be submitted in Germany because the medical product is registered in Germany). In other embodiments, the user of the user computing device 108 may provide case localization data for a specific medical product to the provider computing system 104 such that all case datasets associated with the specific medical product include the case localization provided by the user.

Once the provider computing system 104 has received the request to generate and/or submit the case dataset(s), the method 200 proceeds to step 212 at which the provider computing system 104 determines general case data and regional case data based on the adverse event data. The general case data may be determined based on and including the adverse event data received at step 204. For example, the general case data may be or include case data that is included in a case regardless of country in which the case is to be submitted. In this regard, the general case data may include a case number, seriousness of the adverse event, an expectedness of the adverse event, case contact data, medical product data, adverse event data, patient data, and the like. Further, the general case data may include text data in a first language (and/or a second language) and multiple field codes (e.g., E2B(R3) or E2B(R2) codes) that correspond to one or more fields of the case. For example, the general case data may include text data for each field that is specified as being text in the E2B XML file format and a field code for each field that is specified as being a code in the E2B XML file format. In this regard, the provider computing system 104 may determine or generate the general case data by transforming one or more portions of the adverse event data into the respective field codes of the case data.

In some embodiments, the provider computing system 104 may determine or generate the general case data prior to receiving the request to generate and submit the one or more cases (e.g., prior to step 208). Then, at step 212, the provider computing system 104 may retrieve the general case data from the central document repository 132.

In some embodiments at step 212, the provider computing system 104 may further determine regional case data based on the adverse event information and/or the case localization data. In this regard, the provider computing system 104 may generate case data including general case data and regional case data at step 212. The regional case data may be or include case data that is regional or included in the case for the specific country of the case localization data. In this regard, the regional case data may be determined based on the case localization data (i.e., the country in which the case is to be submitted) and the adverse event data. In some embodiments, the regional case data may not be received at step 212 but is received at step 220 from the user computing device 108. In other embodiments, the regional case data may be determined at step 212 based on the received adverse event data and as identified by the case localization data. For example, the provider computing system 104 may determine, based on the case localization data indicating the case is to be submitted to the health agency in China (e.g., the National Medical Products Administration (NMPA)), that the regional health data is to include an NMPA report classification and additional pregnancy related data (see FIG. 4B). Then, based on the case localization data, the provider computing system 104 may search the adverse event data for the NMPA report classification and any additional pregnancy data. If found, the provider computing system 104 may determine and populate the regional case data.

In some embodiments, the provider computing system 104 may first determine or identify the requisite regional case data based (solely) on the case localization data and then determine or receive the determined requisite regional case data.

In some embodiments, after receiving the request to generate the case at step 208 or after determining the case data at step 212, the provider computing system 104 checks case data and/or adverse event data against other cases stored in the central document repository 134. For example, the provider computing system 104 may return a list of cases to which the case to-be generated may be a duplicate of or be related to and provide the list to the user computing device 108. In response to the user computing device 108 indicating that the potential case is not a duplicate, the user computing device 108 may then proceed to step 212 or step 216.

Once the provider computing system 104 has determined the case data, the method 200 proceeds to step 214 at which the provider computing system 104 determines multiple regional case fields based on the case localization data. The regional case fields may be determined based on the case localization data (and therefore specific to the country of localization (e.g., China)) and used to receive the regional case data. For example, the provider computing system 104 may determine or generate the multiple regional case fields to be generated on a user interface of the user computing device 108 and presented to the user (see FIG. 3C) to receive the regional case data. For instance, in response to the case localization data indicating the country in which the case is to be localized is China, the provider computing system 104 may generate a first regional case field which is a drop down box including multiple options for NMPA report classifications and a second regional case field which is a text box for additional pregnancy related information to be received in.

Once the provider computing system 104 has determined the multiple regional case fields based on the case localization data, the method 200 proceeds to step 216 at which the provider computing system 104 provides the general case data and the multiple regional case fields to the user computing device 108. In some embodiments, the provider computing system 104 provides the general case data to the translator computing device 112 at step 216. The general case data and the multiple regional case fields may be provided to the user computing device 108 or the translator computing device 112 for display on a multilingual user interface (see FIGS. 3A-3C) and verification. For example, the user computing device 108 may display a user interface on which the case data and the regional case fields are displayed and, in response, receives an indication of verification. In some embodiments, the provider computing system 104 provides the text data in the first language of the general case information to the user computing device 108 or the translator computing device 112 but not the verbatim multiple field codes. Instead, the provider computing system 104 may provide a text representation (also referred to as field code terms) of the field codes (e.g., "Spontaneous" as compared to the field code "1"). In this regard, at step 216, the provider computing system 104 may provide the text information of the general case information and field code terms along with the regional case fields to the user computing device 108 or the translator computing device 112. In some embodiments, the provider computing system 104 further provides the adverse event data to the user computing device 108 or the translator computing device 112 at step 216.

Once the provider computing system 104 has provided the general case data the method 200 proceeds to step 220 at which the provider computing system 104 receives the regional case data from the user computing device 108 or the translator computing device 112. For example, the user computing device 108 may receive the regional case data in the multiple regional case fields and provide the regional case data to the provider computing system 104 in response.

In some embodiments, at step 220, the provider computing system 104 further receives missing case data (i.e., case data that was not previously determined at step 212 but is required to generate the case) from the user computing device 108 or the translator computing device 112. For example, the provider computing system 104 may receive the missing case data along with the regional case data via a case page (see FIGS. 3A-3C) displayed on a user interface to the user of the user computing device 108. For example, via the user interface, the user of the user computing device 108 may provide case data that was not determined based on the adverse event data such as the regional case data, one or more portions of the regional case data, and the like.

Once the provider computing system 104 receives the regional case data from the user computing device 108 or the translator computing device 112, the method 200 proceeds to step 224 at which the provider computing system 104 determines if the general case data includes a translation of the text data in a second language. As described herein, the general case data may include text data in a first language, which may be specific to the case localization data or the user. For example, if the case is to be submitted in Japan (as identified in the case localization data), the provider computing system 104 may require the general case data to receive text data in the Japanese language. Further, the provider computing system 104 may require the general case data to receive a translation of each piece of the text data from the Japanese language to the English language. In this regard, the provider computing system 104 may receive or determine general case data with text data in a first language (e.g., Japanese) and in a second language (English). Therefore, at step 224, the provider computing system 104 may determine if the general case data includes the text data in the first language (specific to the case localization data) and the second language. In some embodiments, the second language is English. In other embodiments, the second language is a display language set by the user and received from the user computing device 108 by the provider computing system 104.

If at step 224 the provider computing system 104 determines the general case data does not include a translation of the text data in the second language, the method 200 proceeds to step 228 in which the provider computing system receives the translation of the text data in the second language from at least one of the user computing device 108 or the translator computing device 112. For example, translator computing device 112 may interface with the provider computing system 104 to receive the dual text fields and associated labels described herein as well as the text data in the first language. Then, the dual text fields may be displayed to the translator via the user interface and the translator may translate the text data (shown in the dual text fields) into the second language and provide it to the dual text fields via the user interface. Once finished, the translator may indicate as such (e.g., by selecting a save button) and the translator computing device 112 may provide the text data in the second language to the provider computing system 104. Similarly, the translation of the text data from the first language to the second language may be received from the user computing device 108. In some embodiments, prior to step 228, the provider computing system 104 may provide the case data and/or the adverse event data to the at least one of the user computing device 108 or the translator computing device 112 for display or representation (e.g., on a user interface). Then, at step 228, the provider computing system 104 may receive the translation of the text data in the second language via the user interface.

In some embodiments, the translation of the text data from the first language to the second language may be received from the user computing device 108 or the translator computing device 112, by the provider computing system 104, at the same time as the regional case data (e.g., at step 220). In other embodiments, the provider computing system 104 may receive the translation of the text data in the second language from the translator computing device 112 before or after receiving the regional case data from the user computing device 108 (e.g., before or after step 220).

In some embodiments, at step 224, the provider computing system 104 determines if the text data of the general case data is in the first language and the second language. For example, at step 224, the provider computing system 104 may determine the text data has been provided in the second language (e.g., English) but not in the first language (e.g., Japanese). In this regard, the method 200 may proceed to step 228 if the text data is not provided in the first language and the second language. Further, at step 228, if the text data is provided in the second language but not the first language, the provider computing system 104 may receive the text data in the first language. In this regard, the provider computing system 104 may not proceed with steps 232-244 until the text data has been received in the first language and the second language from at least one of the user computing device 108 or the translator computing device 112.

In some embodiments, at step 228 and/or in response to determining the general case data does not include a translation of the text data in the second language, the provider computing system 104 may translate the text data from the first language to the second language using machine translation. For example, the provider computing system 104 (and specifically the translation and language management circuit 150) may use rule-based machine translation (e.g., dictionary-based machine translation using a translation repository (not shown)), transfer-based machine translation, interlingua machine translation, statistical machine translation, example-based machine translation, hybrid machine translation, and/or Neural machine translation using a neural network (not shown). In some embodiments, the provider computing system 104 may translate fields which are not included in a submission of the case (e.g., which are not included in an E2B XML file submission). For example, the provider computing system 104 may translate fields such as an associated organization, a case processor, an organization contact, and the like. In some embodiments, the provider computing system 104 may translate field labels (e.g., regional field labels and general field labels) and drop down box options (e.g., field code terms each associated with a field code) that are provided to at least one of the user computing device 108 or the translator computing device 112 based on at least one of the display language set by the user or the translator or the case localization data. For example, if the provider computing system 104 receives an indication the user's display language is Chinese from the user computing device 108, the provider computing system 104 may translate each regional field label and drop down box option to the display language of the user.

If at step 224 the provider computing system 104 determines the general case data includes a translation of the text data in the second language or after the provider computing system 104 receives or determines the translation of the text data in the second language at step 228, the method 200 proceeds to step 232 at which the provider computing system 104 generates a first case dataset (also referred to as a regional, domestic, or local case dataset). The first case dataset may include the regional case data, the text data in the first language, and the multiple field codes (e.g., E2B codes) associated with or matching one or more portions of the general case data (i.e., the case data not including the translation of the text data in the second language). Further, the first case dataset may be generated as an E2B XML file including regional case data, the text data in the first language, and the multiple field codes therein (or in associated files sent with the E2B XML file). In other embodiments, the first case dataset may be generated as other electronic file types (e.g., PDF file, Word Document file, XML file, CSV file, etc.).

In some embodiments, after generating the first case dataset, the provider computing system 104 may store the first case dataset within the central document repository 132. In some embodiments, at step 232, the provider computing system 104 may generate or update a first case data object associated with the first case dataset and store the first case data object in the central document repository 132. For example, the provider computing system 104 may generate the first case data object including the text data in the first language, the multiple fields codes, and the regional case data. In some embodiments, the first case data object may include a reference pointer to a medical product data object (e.g., a regional medical product data object including regional medical product data (e.g., a product registration number in the country indicated by the case localization data, global medical product data, and the like) and/or one or more adverse event data objects associated with the adverse event information.

Once the provider computing system 104 has generated the first case dataset, the method 200 proceeds to step 236 at which the provider computing system 104 outputs or transmits the first case dataset. In some embodiments, the provider computing system 104 may output the first case dataset to at least one of a first third-party computing system 116 of the one or more third-party computing systems 116, the user computing device 108, or the translator computing device 112. The first third-party computing system 116 may be associated with a health authority or agency indicated by the case localization data. For example, if the case localization data indicates the case dataset is to be submitted in Japan, the first third-party computing system 116 may be associated with or operated by the PMDA. In another example, the case localization data indicates the case dataset is to be submitted in Europe, the first third-party computing system 116 may be associated with or operated by the EMA. In some embodiments, prior to providing the first case dataset to the first third-party computing system 116 (i.e., prior to step 236), the provider computing system 104 may determine the first third-party computing system 116 and/or the government health authority the first case dataset is to be provided or transmitted to.

In some embodiments, prior to providing the first case dataset to the first third-party computing system, the provider computing system 104 may provide the first case dataset to the user computing device 108 for validation by the user of the user computing device 108. Further, in response to receiving an indication of validation by the user of the user computing device 108, the provider computing system 104 may provide the first case dataset to the first third-party computing system 116.

Once the provider computing system 104 has provided or transmitted the first case dataset to at least one of the first third-party computing system 116 or the user computing device 108, the method 200 proceeds to step 240 at which the provider computing system generates a second case dataset (also referred to as a global case dataset). The second case dataset may include the text data in the second language and the multiple field codes (e.g., E2B codes) associated with or matching one or more portions of the general case data (i.e., the case data not including the regional case data and the text data in the first language). Further, the second case dataset may be generated as an E2B XML file including the text data in the second language and the multiple field codes therein (or in associated files sent with the E2B XML file). In other embodiments, the second case dataset may be generated as other electronic file types (e.g., PDF file, Word Document file, XML file, CSV file, etc.).

In some embodiments, after generating the second case dataset, the provider computing system 104 may store the second case dataset within the central document repository 132. In some embodiments, at step 244, the provider computing system 104 may generate or update a second case data object associated with the second case dataset and store the second case data object in the central document repository 132. For example, the provider computing system 104 may generate the second case data object including the text data in the second language and the multiple fields codes. In some embodiments, the second case data object may include a reference pointer to the first case data object of the first case dataset and vice versa. Further, the second case data object may include a reference pointer to the same medical product data object (e.g., a regional medical product data object including regional medical product data (e.g., a product registration number in the country indicated by the case localization data, global medical product data, and the like) and/or the one or more adverse event data objects associated with the adverse event information of the first medical product data object. In this way, if any changes or updates are made to the medical product data object or the adverse event data object, both the first case data object and the second case data object are automatically updated to reflect these changes or updates (due to the reference pointer). In this regard, the case data (e.g., the general case data) may be shared between the first case dataset and the second case dataset such that any change to the case data is automatically reflected in each case and associated data objects (due to the reference pointers described herein).

In some embodiments, prior to generating the second case dataset, the provider computing system 104 may receive a second request from the user computing device 108 to generate the second case dataset. Further, the second request may identify or including the country or health agency in which the second case dataset is to be submitted (e.g., in second case localization data).

Once the provider computing system 104 has generated the second case dataset, the method 200 proceeds to step 244 at which the provider computing system 104 outputs or transmits the second case. In some embodiments, the provider computing system 104 may output or provide the second case dataset to at least one of a second third-party computing system 116 of the one or more third-party computing systems 116, the user computing device 108, or the translator computing device. The second third-party computing system 116 may be associated with a health authority or agency indicated by the case localization data. For example, if the case localization data indicates the case is to be submitted in Japan and the US, the second third-party computing system 116 may be associated with or operated by the FDA (e.g., the FDA submissions gateway). In some embodiments, prior to providing the second case dataset to the second third-party computing system 116 (i.e., prior to step 244), the provider computing system 104 may determine the second third-party computing system 116 and/or the government health authority the second case dataset is to be provided or transmitted to. In some embodiments, at step 244, the provider computing system 104 may provide or transmit the second case dataset to multiple third-party computing systems 116.

In some embodiments, prior to providing the second case dataset to the second third-party computing system, the provider computing system 104 may provide the second case dataset to the user computing device 108 for validation by the user of the user computing device 108. Further, in response to receiving an indication of validation by the user of the user computing device 108, the provider computing system 104 may provide the second case dataset to the second third-party computing system 116.

Figure 3A:
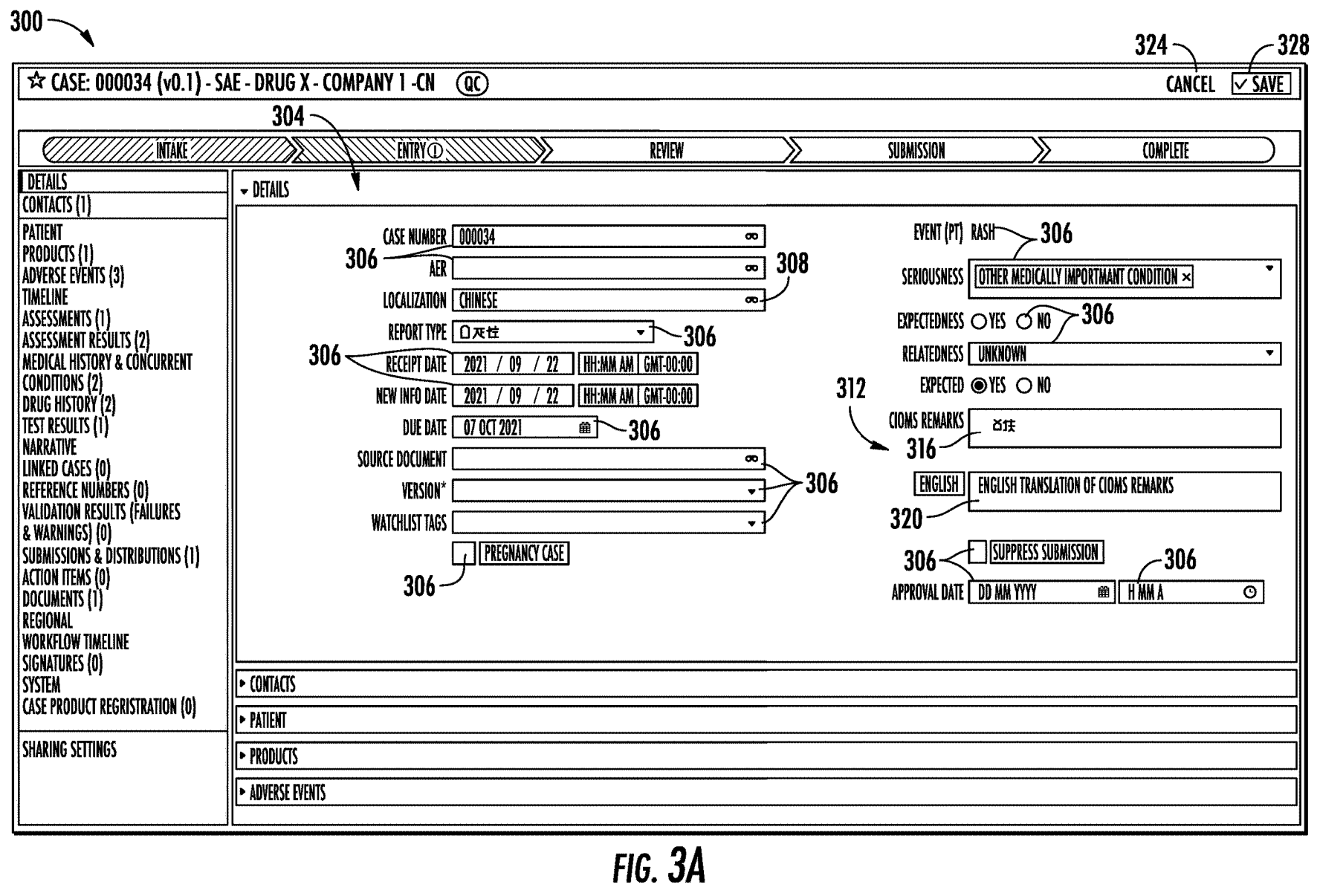
Figure 3B:
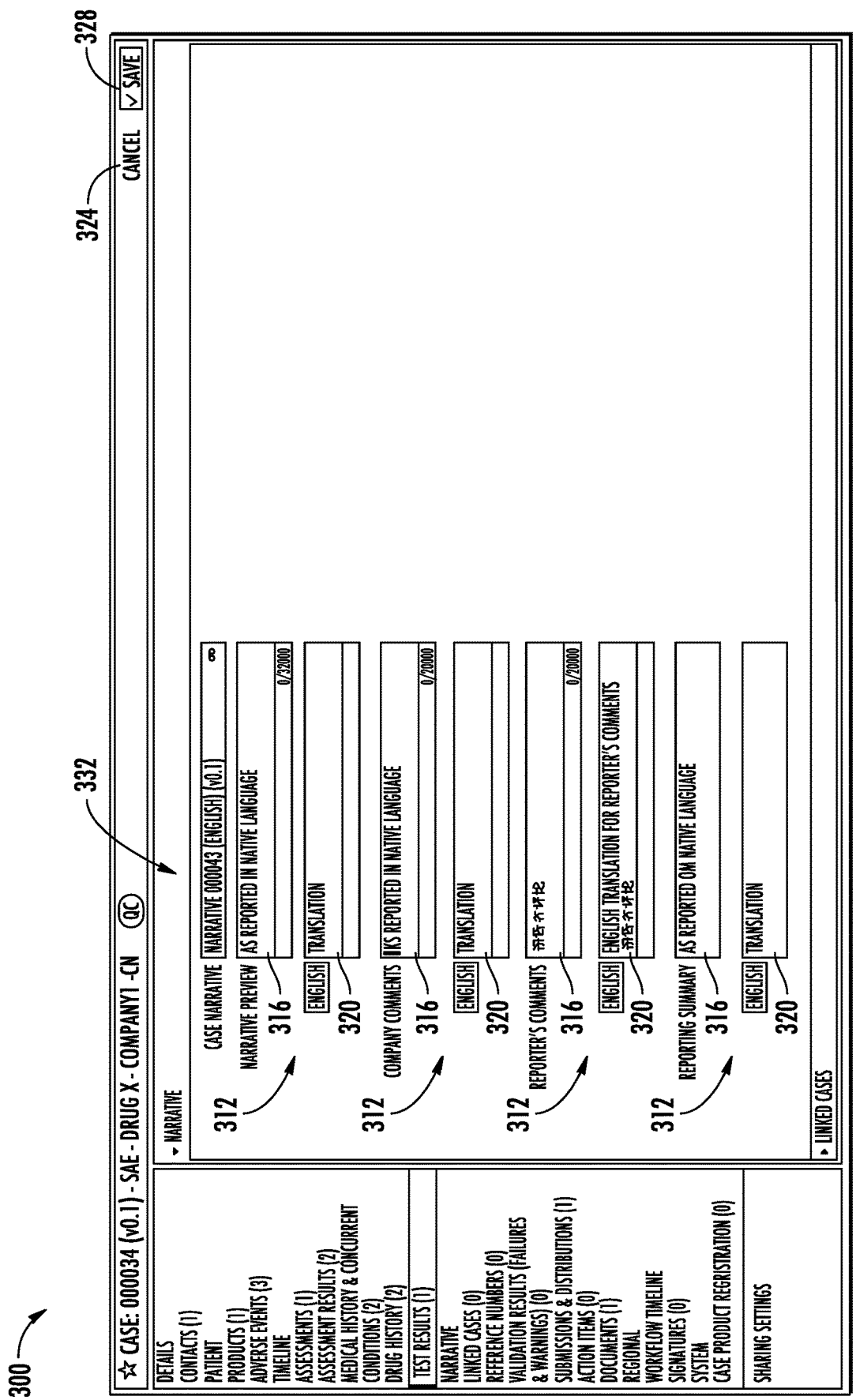
Figure 3C:
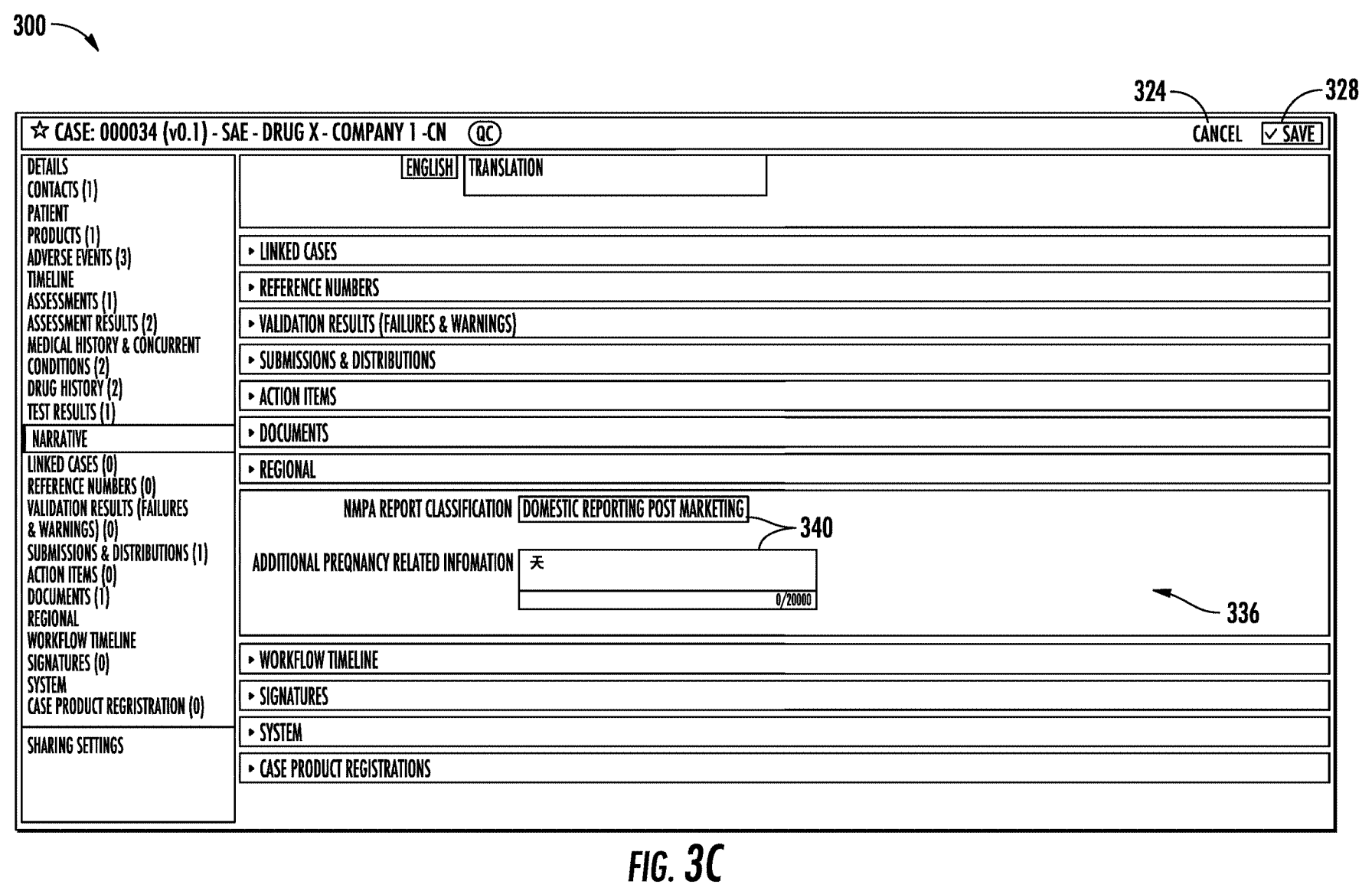
Figure 4:
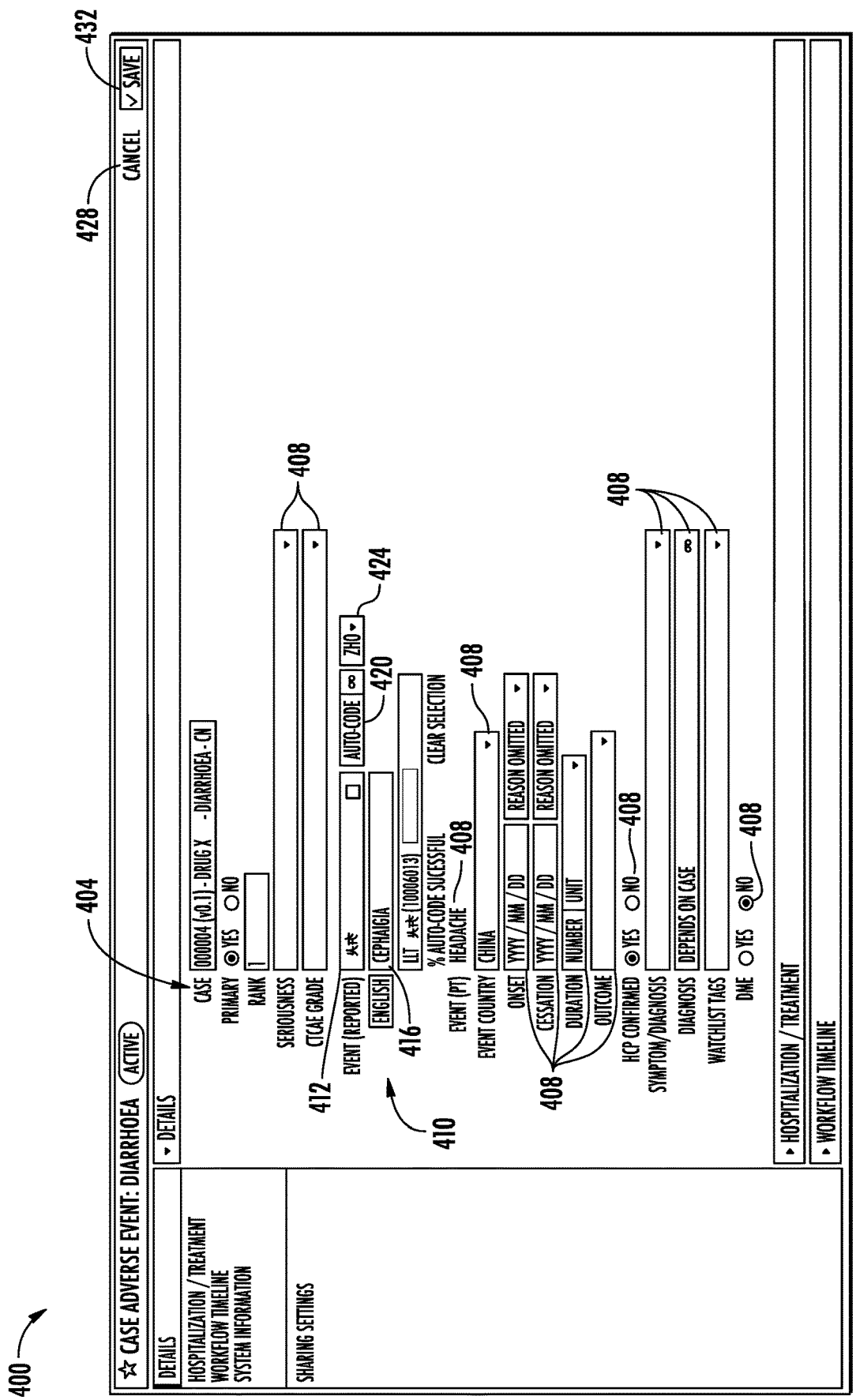
FIG. 4 is an illustration of some aspects of a user interface generated by the multilingual data processing and arrangement system of FIG. 1 to receive and multilingually code terms of an adverse event, according to an example embodiment.

Referring now to FIGS. 3A-4, user interfaces shown and displayed to the user of the user computing device 108 or the reporter of the translator computing device 112 during the method 200 are shown, according to example embodiments. As described herein, the user interfaces of FIGS. 3A-4 may be one or more of web interfaces generated by the provider computing system 104 and rendered by the user computing device 108 or the translator computing device 112 as part of a web application or graphical user interfaces downloaded and generated by the user computing device 108 or the translator computing device 112 as part of a software application (e.g., a mobile application, etc.). Further, the user interfaces shown on FIGS. 3A-4 allow for communication between the user or the translator and the provider computing system 104 via the user computing device 108 (specifically via the I/O circuit 158) or the translator computing device 112 (specifically via the I/O circuit 170). Through interaction with the various user interfaces, the user or the translator may provide user input, feedback, and other data requested by the provider computing system 104. In this regard, it should be understood that each interaction described herein by the user or the translator with the user interfaces of FIGS. 3A-4 may be provided to the user computing device 108 or the translator computing device 112 and then transmitted to the provider computing system 104 and that each action described herein as occurring to the user computing device 108 or the translator computing device 112 (e.g., navigating to a certain page, generating a popup, etc.) may be performed by the provider computing system 104.

Referring now to FIGS. 3A-3C, a multilingual case page 300 (also referred to as a domestic or regional case page), which can be displayed on a display of the I/O circuit 158 of the user computing device 108 or the I/O circuit 170 of the translator computing device 170, is shown. In general, the multilingual case page 300 provides the user or the translator with an interface to provide case data including regional case data, multilingual text data, and other general case data and then send the case data to the provider computing system 104 for storage (and use in generating one or more case datasets). As shown, the multilingual case page 300 includes a case details section 304, a cancel button 324, a save button 328, a case narrative section 332, and a regional section 336.

The case details section 304 provides the user an interface to manage and set details of the case data such as general case data (e.g., case number, receipt date, adverse event term or code, expectedness data, etc.) including multilingual text data. As shown, the case details section 304 includes multiple general case data fields 306, a case localization field 308, and one or more duolingual (also referred to as multilingual) text fields 312.

Likewise, the case narrative section 332 (see FIG. 3B) provides the user or the translator an interface to manage and set the narrative of the case (and as included in the case data) in two or more languages. As shown, the case narrative section 332 includes multiple duolingual text fields 312 through which the user and/or the translator can provide narrative text data in a first language and a second language.

The general case data fields 306 are input fields (e.g., text fields, search fields, drop down boxes and associated options, checkboxes, or other user interface widgets or controls) through which the user of the user computing device 108 can provide general case data to the user computing device 108 and, when saved, to the provider computing system 104. For example, as shown, the details section 304 includes a case number field 306, an adverse event report (AER) field 306, a report type field 306, a receipt date field 306, a new info date field 306, and the like. Through interaction with and by providing user input to the general case data fields 306, the user of the user computing device 108 may provide missing general case data or correct or overwrite general case data to the user computing device 108 and then the provider computing system 104 (as described in step 220 of the method 200).

The case localization field 308 is a selectable text or search field through which the user of the user computing device 108 can set or change the case localization data. For example, the user of the user computing device 108 may select the case localization field 308 and change or set the case localization data as "Chinese" (see FIG. 3A), which may then be provided to the user computing device 108 and the provider computing system 104. In some embodiments, in response to receiving an updated or new case localization data, the provider computing system 104 may set the language for one or more options of one or more of the general case fields 306 (see the report type field 306 on FIG. 3A) and determine the requisite regional case data for China. Further, based on the determined regional case data, the provider computing system 104 may generate multiple regional case fields and provide them to the user computing device 108 for display on the user computing device 108 (see FIG. 3C). In some embodiments, the provider computing system 104 may further generate the duolingual text fields 312 as receiving the text data in a first language (e.g., Chinese) based on the case localization data and in a second language (e.g., English).

In some embodiments, the case localization field 308 is a search field the user may provide text (i.e., a localization search term) to and then select a search button to return matching results. For example, the user may enter the term "China" to the case localization field 308 which may be received by the user computing device 108. The user computing device 108 may provide the localization search term to the provider computing system 104, which may search a localization repository (not shown) for matching search results and return the matching search results to the user computing device 108 for display on the multilingual case page 300. In other embodiments, the case localization field 308 is a read-only field (i.e., is not editable or selectable) once the provider computing system 104 has received case localization data. For example, the provider computing system 104 may receive the case localization before determining or receiving the case data, and the multilingual case page 300 may include a read-only case localization field 308.

The duolingual text fields 312 are multiple text fields through which the user and/or the translator of the user computing device 108 and the translator computing device 112, respectively, can provide text data in a first language and a second language to the user computing device 108 and the provider computing system 104. As shown, each duolingual text fields 312 includes a first language text field 316 and a second language text field 320, directly adjacent (i.e., below) the first language text field 316. Further, the second language text field 320 includes an indicator (e.g., "English") of the language the text in the second text field is to be. In some embodiments, the color of the indicator changes (e.g., from orange to grey, from red to black, etc.) when the multilingual case page 300 and the second language text field 320 has received text data in the correct language (e.g., in the second language). Further, as described herein, the first language text field 316 may require the user to provide the text data in a first language that is determined based on the case localization data (e.g., the Chinese language if the case is to be submitted in China, the English language if the case is to be submitted globally, the Japanese language if the case is to be submitted in Japan, etc.).

In some embodiments, if the duolingual text field 312 does not receive the text data in the first language in the first language text field 316 or the text data in the second language in the second language text field 320, the user computing device 108 or the provider computing system 104 may notify the user via the user computing device 108 (e.g., via a popup notification, via an error message, etc.). In other embodiments, the first language text field 316 may only allow the user to provide text data in the first language (e.g., delete or prevent text data received in languages other than the first language) and/or the second language text field 320 may only allow the user to provide text data in the second language (e.g., delete or prevent text data received in languages other than the first language).

The duolingual text fields 312 may receive text data from the user of the user computing device 108 and the translator of the translator computing device 112. For example, the user, via the user computing device 108, may provide text data in the first language to the first language text field 316 and provide the text data to the provider computing system 104 for storage (e.g., by selecting the save button 328). The provider computing system 104 may then provide the text data to the translator computing device 112 for display on the multilingual case page 300. The translator may then translate the text data from the first language to the second language and provide the text data in the second language to the second language text field 320 and provide the text data to the provider computing system 104 for storage (e.g., by selecting the save button 328).

By including duolingual text fields 312 with the first language text field 316 and the second language text field 320, the provider computing system 104 provides a technical improvement to the technical problem of multilingual data intake and processing. For example, because the multilingual case page 300, generated by the provider computing system 104, includes the first language text field 316 directly adjacent the second language text field 320, the provider computing system 104 uses less processing power and memory. By including the first language text field 316 directly adjacent the second language text field 320, the multilingual case page 300 provides for centralized multilingual data intake and processing. For example, instead of the user having to access two, separate, case pages (e.g., one for the first case and one for the second case), the multilingual case page 300 provides an interface to enter text information in a first language and a second language, in a single location (e.g., the duolingual text field 312). As a result, the user of the user computing device or the translator computing device 112 does not have to access, edit, and flip between the two separate cases to translate the text information from the first language into the second language, which saves on processing power and memory by the provider computing system 104 (e.g., as the provider computing system 104 does not have to generate and provide the two separate case pages to the user computing device 108).

The cancel button 324 is a selectable button that, when selected, returns the user to a previous page (not shown), and does not save any changes that have been made on or via the multilingual case page 300. In comparison, the save button 328 is a selectable button that, when selected, saves any changes that have been made on or via the multilingual case page 300. For example, the user computing device 108 may record or determine any changes or additions to the case information (e.g., the regional case information, the general case information, etc.) the user made via the multilingual case page 300 and provide them to the provider computing system 104. The provider computing system 104 may then update case information and associated data object within the central document repository 132 to reflect the changes made by the user.

Referring to FIG. 3C, the regional section 336 provides the user an interface to manage and set the regional case data (e.g., NMPA report classification, additional pregnancy related data, PMDA reporting category, Day 0 of reporting timeframe for PMDA, etc.). As shown, the regional section 336 of the multilingual case page 300 includes multiple regional case data fields 340.

The regional case data fields 349 are input fields (e.g., text fields, search fields, drop down boxes and associated options, checkboxes, or other user interface widgets or controls) through which the user of the user computing device 108 can provide regional case data to the user computing device 108 and, when saved, to the provider computing system 104. For example, as shown, the regional section 336 includes a NMPA report classification drop down box and regional case data field 340 and an additional pregnancy related data text field and regional case data field 340.

As described herein, the regional case data fields 340 may be generated or determined, by the provider computing system 104, based on the case localization data. For example, in response to the case localization data indicating the case is to be submitted in China, the provider computing system 104 may generate the NMPA report classification drop down box and regional case data field 340 and the additional pregnancy related data regional data field 340, as shown on FIG. 3C, and provide the regional case data fields 340 to the user computing device 104 for display on the multilingual case page 300. In another example, in response to the case localization data indicating the case is to be submitted in Korea, the provider computing system 104 may generate a health professional type drop down box and regional case data field 340, a medicinal product ID text field and regional case data field 340 and provide the regional case data fields 340 to the user computing device 104 for display on the multilingual case page 300. Further regional case data fields 340 are possible for each different case localization and are not limited to those shown and described.

Still referring to FIGS. 3A-3C, each general case data field 306, case localization data field 308, duolingual text field 312, and regional case data field 340 includes a field label (e.g., "Case Number", "Report Type", "Narrative Preview", "PMDA Reporting Category", etc.). As described herein, each field label may be translated into a specific language, by the provider computing system 104, and provided to the user computing device 108 or the translator computing device 112 for display on the multilingual case page 300. For example, the provider computing system 104 may receive or a determine a display language associated with the user computing device 108 and/or the translator computing device 112, translate each of the field labels to the received or determined display language, and provide the field labels to the user computing device 108 and/or the translator computing device 112. In some embodiments, the provider computing system 104 may determine the display language of the user or the translator based on a country of residence received from the user computing device 108 and/or the translator computing device 112. For example, if the user, via the user computing device 108, indicates their country of residence is Japan, the provider computing system 104 may set the user's display language to Japanese.

In some embodiments, the provider computing system 104 may further translate general case data fields 306 to the language of the case localization data for which there is an associated or matching field code (e.g., E2B code) (also referred to as field code terms or fields 306). For example, as shown on FIG. 3A, the provider computing system 104 may translate the report type drop down box options and general case data field 306 to the language of the localization (e.g., Chinese). As identified in the E2B(R3) Electronic Transmission of Individual Case Safety Reports Implementation Guide, the E2B XML file includes a field code for each report type (also referred to as Type of Report) option (e.g., the E2B code of 1 for Spontaneous, the E2B code of 2 for Report from Study, the E2B code of 3 for Other, and so on). Further, the provider computing system 104 may provide the translated general case data fields 306 to the user computing device 108 or the translator computing device 112 for display on the multilingual case page 300.

In some embodiments, the provider computing system 104 may modify or convert date data or measurements included in the adverse event data, the general case data, or the regional case data based on the case localization data. For example, in response to receiving adverse event data with a temperature in U.S. units (e.g., degrees Fahrenheit) and a case localization of with a different temperature unit (e.g., Germany), the provider computing system 104 may convert the temperature to a second unit (e.g., degrees Celsius) based on the case localization data, before providing the date to the user computing device. In another example, in response to receiving or determining general case data with a date in a first date format (e.g., MM/DD/YYYY) and a case localization with a second date format (e.g., YYYY/MM/DD), the provider computing system 104 may convert the date from the first date format to the second date format, before providing the date to the user computing device.

Referring now to FIG. 4, a multilingual adverse event page 400, which can be displayed on a display of the I/O circuit 158 of the user computing device 108 or I/O circuit 170 of the translator computing device 170, is shown. In general, the multilingual adverse event page 400 provides the user with an interface to provide or update adverse event data including multilingual coding of digitally-substantiated terms (e.g., MedDRA terms) and associated codes of the adverse event. As shown, the multilingual adverse event page 400 includes an adverse event details section 404, a cancel button 428, and a save button 432.

The adverse event details section 404 provides the user an interface to manage and set details of the adverse event such as the digitally-substantiated term, the country in which the adverse event took place, the date of onset of the adverse event, the date of cessation of the adverse event, the outcome of the adverse event, etc. As shown, the adverse event details section 404 includes multiple adverse event data fields 408 and a multilingual event term field 410.

The adverse event data fields 408 are input fields (e.g., text fields, search fields, drop down boxes and associated options, checkboxes, or other user interface widgets or controls) through which the user of the user computing device 108 can initially set or change and provide adverse event to the user computing device 108 and, when saved, to the provider computing system 104.

The multilingual event term field 410 is a group of input fields through which the user of the user computing device 108 can provide a digitally-substantiated term (e.g., a MedDRA), in one or more languages, and determine or receive an associated code (e.g., a MedDRA code). As shown, the multilingual event term field 410 includes a digitally-substantiated term field 412, a translated digitally-substantiated term field 416, a code button 420, and a language drop down box 424.

The digitally-substantiated term field 412 is a selectable text field through which the user can provide a digitally-substantiated term to the user computing device 108. Further, the user can provide the digitally-substantiated term in a first language of the user's choosing (e.g., English, Chinese, etc.). Similarly, the language drop down box 424 is a selectable drop down box 424 that, when selected, displays multiple selectable language options (e.g., as represented by the respective language code). For example, the user of the user computing device may select the language drop down box 424 and language options such as ENG for English, ZHO for Chinese, JA for Japanese, and the like. The user may select the language option of the digitally-substantiated term. In some embodiments, the user computing device 108 or the provider computing system 104 automatically detect or determine the language of the term in the digitally-substantiated term field 412 and set the language drop down box 424 to the respective language. For example, the provider computing system 104 may receive the term in the digitally-substantiated term field 412 and determine the term is in the Chinese language. In response, the provider computing system 104 may set the language drop down box 424 to ZHO for Chinese and provide the language or the selected option of the language drop down box 424 to the user computing device 108 for display.

The code button 420 is a selectable button that, when selected by the user of the user computing device 108 provides the term (referred to as a potential term) of the digitally-substantiated term field 412 and/or the selected language option of the language drop down box 424 to the provider computing system 104 to determine an associated code. For example, the provider computing system 104 may receive the potential term of the digitally-substantiated term field 412 and search the digitally-substantiated term and code repository 134 for a matching code. In some embodiments, the provider computing system 104 may first translate the potential term from the first language to a second language based on the selected language option of the language drop down box 424 and the term. In other embodiments, the digitally-substantiated term and code repository 134 may include each digitally-substantiated term in multiple languages, and the provider computing system 104 may search the digitally-define term and code repository 134 based on the selected language option of the language drop down box 424 and the potential term. If the digitally-substantiated term and repository 134 returns a matching digitally-substantiated term and associated code, the provider computing system 104 may provide the term and the associated code to the user computing device 108 for display (e.g., on the indicator proximate the bottom of the digitally-substantiated term field 412). Further, the provider computing system 104 may receive a translation of the term into the second language (e.g., English) and provide the translation of the term to the user computing device 108 for display in the translated digitally-substantiated term field 416.

The multilingual coding process described herein may take place as a part of step 204 in which the provider computing system 104 receives adverse event data. For example, the user, via the user computing device, may provide the digitally-substantiated term to the provider computing system 104 at step 204 and code the digitally-substantiated term using the multilingual coding process.

The cancel button 428 is a selectable button that, when selected, returns the user to a previous page (e.g., the multilingual case page 300) and does not save any changes that have been made on or via the multilingual adverse event page 400. In comparison, the save button 432 is a selectable button that, when selected, saves any changes that have been made on or via the multilingual adverse event page 400. For example, the user computing device 108 may record or determine any changes or additions to the adverse information (e.g., the digitally-substantiated term and code, the seriousness, the rank, etc.) the user made via the multilingual adverse event page 400 and provide them to the provider computing system 104. The provider computing system 104 may then update adverse event information and associated data object within the central document repository 132 to reflect the changes made by the user.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FBGAs), digital signal processors (DSPs), or other suitable electronic data processing components structured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An example system for implementing the overall system or portions of the embodiments might include a general purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for generating a first case dataset in a first language in a multilingual data processing system, wherein the multilingual data processing system comprises a provider computing system and a translator computing device connected by a secure network, the method comprising:
receiving, by a network interface circuit of the provider computing system, adverse event data associated with one or more adverse events;
receiving, by the network interface circuit, a request to generate the first case dataset, wherein the request includes case localization data identifying at least one health agency, and
wherein the at least one health agency is at least one of the Pharmaceutical and Medical Devices Agency (PMDA) of Japan or the National Medical Products Administration (NMPA) of China;
identifying, by a processing circuit of the provider computing system, regional case data to be included in the first case dataset based on the case localization data identifying the at least one health agency;
determining, by the processing circuit, at least one regional case field based on the case localization data, wherein the at least one regional case field is associated with the regional case data such that the at least one regional case field identifies the regional case data;
determining, by the processing circuit, a potential duplicate case dataset which is a potential duplicate of the first case dataset;
determining, by the processing circuit and in response to determining the potential duplicate case dataset is not a duplicate of the first case dataset, case data including general case data and the regional case data based on the adverse event data and the case localization data, wherein the general case data includes text data in the first language and a plurality of field codes;
providing, by the network interface circuit, the case data and the at least one regional case field to the translator computing device to enable display on a user interface including a plurality of duolingual text fields, wherein each duolingual text field comprises a first language text field including at least a portion of the text data in the first language and a second language text field adjacent the first language text field;
receiving, by the network interface circuit, the text data in the second language from the translator computing device, wherein the text data in the second language is received via the second language text fields of the plurality of duolingual text fields;
generating, by the processing circuit, the first case dataset including the regional case data, the text data in the first language, and the plurality of field codes; and
outputting, by the network interface circuit, the first case dataset.

2. The method of claim 1, wherein the second language is English, the first case dataset is generated as an E2B(R2) XML file or an E2B(R3) XML file, and the plurality of field codes are E2B(R2) codes or E2B(R3) codes.

3. The method of claim 2, wherein the general case data further includes a plurality of field code terms in the second language, wherein each field code term is associated with a field code of the plurality of field codes, and wherein the method further comprises:
translating, by the processing circuit, the plurality of field code terms into the first language based on the case localization data; and
providing, by the processing circuit, the plurality of field code terms to the translator computing device to enable display on the user interface.

4. The method of claim 1, wherein the adverse event data includes date data and wherein determining the case data comprises:
determining, by the processing circuit, the date data of the adverse event data is in a first date format; and
modifying, by the processing circuit, the date data to be in a second date format based on the case localization data,
wherein the first case dataset further includes the date data in the second format.

5. The method of claim 1, wherein each duolingual text field of the plurality duolingual text fields further includes an indicator directly adjacent the second language text field, wherein the second language field is directly adjacent the first language field, and wherein the indicator changes color when the second language text field receives at least a portion of the text data in the second language.

6. A method for generating a first case dataset in a first language in a multilingual data processing system, wherein the multilingual data processing system comprises a provider computing system and a user computing device connected by a secure network, the method comprising:

receiving, by a network interface circuit of the provider computing system, adverse event data associated with one or more adverse events;

receiving, by the network interface circuit, a request to generate the first case dataset;

receiving, by the network interface circuit case localization data identifying the Pharmaceutical and Medical Devices Agency (PMDA) of Japan;

determining, by a processing circuit of the provider computing system, at least one regional case field based on the case localization data identifying the PMDA, wherein the at least one regional case field identifies regional case data associated with the PMDA;

determining, by the processing circuit, a potential duplicate case dataset which is a potential duplicate of the first case dataset;

determining, by the processing circuit and in response to determining the potential duplicate case dataset is not a duplicate of the first case dataset, general case data based on the adverse event data, wherein the general case data includes text data in the first language and a plurality of field codes;

providing, by the network interface circuit, the general case data and the at least one regional case field to the user computing device to enable display on a user interface including a plurality of duolingual text fields, wherein each duolingual text field comprises a first language text field including at least a portion of the text data in the first language and a second language text field adjacent the first language text field;

receiving, by the network interface circuit, the regional case data and the text data in the second language from the user computing device, wherein the text data in the second language is received via the second language text fields of the plurality of duolingual text fields, and wherein the regional case data is received via the at least one regional case field;

generating, by the processing circuit, the first case dataset including the regional case data, the text data in the first language, and the plurality of field codes; and outputting, by the network interface circuit, the first case dataset.

7. The method of claim 6, wherein the second language is English, wherein the first case dataset is generated as an E2B(R2) XML file or an E2B(R3) XML file, and wherein the plurality of field codes are E2B(R2) codes or E2B(R3) codes.

8. The method of claim 7, wherein the general case data further includes a plurality of field code terms in the second language, wherein each field code term is associated with a field code of the plurality of field codes, and wherein the method further comprises:

translating, by the processing circuit, the plurality of field code terms into the first language; and providing, by the processing circuit, the plurality of field code terms to the user computing device to enable display on the user interface.

9. The method of claim 6, wherein the adverse event data includes measurement data, and wherein determining the general case data comprises:

determining, by the processing circuit, the measurement data of the adverse event data is in a first unit; and converting, by the processing circuit, the measurement data to be in a second unit, wherein the first case dataset further includes the measurement data in the second unit.

10. The method of claim 6, wherein each duolingual text field of the plurality duolingual text fields further includes an indicator directly adjacent the second language text field, wherein the second language text field is directly adjacent the first language text field, and wherein the indicator changes color when the second language text field receives at least a portion of the text data in the second language.

11. A method for generating a first case dataset in a first language in a multilingual data processing system, wherein the multilingual data processing system comprises a provider computing system and a user computing device connected by a secure network, the method comprising:

receiving, by a network interface circuit of the provider computing system, adverse event data associated with one or more adverse events;

receiving, by the network interface circuit, case localization data identifying the National Medical Products Administration (NMPA) of China from the user computing device;

receiving, by the network interface circuit, a request to generate the first case dataset;

determining, by a processing circuit of the provider computing system, a potential duplicate case dataset which is a potential duplicate of the first case dataset;

determining, by the processing circuit and in response to determining the potential duplicate case dataset is not a duplicate of the first case dataset, general case data based on the adverse event data, wherein the general case data includes text data in the first language and a plurality of field codes;

determining, by the processing circuit, a plurality of regional case fields based on the case localization data identifying the NMPA, wherein the plurality of regional case fields identify regional case data associated with the NMPA;

providing, by the network interface circuit, the general case data and the plurality of regional case fields to the user computing device to enable display on a user interface including a regional section comprising the plurality of regional case fields;

receiving, by the network interface circuit, the regional case data and the text data in the second language from the user computing device, wherein the regional case data is received via the plurality of regional fields of the regional section;

generating, by the processing circuit, the first case dataset including the regional case data, the text data in the first language, and the plurality of field codes; and outputting, by the network interface circuit, the first case dataset.

12. The method of claim 11, further comprising:

receiving, by the network interface circuit a request to generate a second case dataset;

generating, by the processing circuit, the second case dataset including the text data in the second language and the plurality of field codes; and outputting, by the network interface circuit, the second case dataset, wherein the second language is English, wherein the first case dataset and the second case dataset are each generated as an E2B(R2) XML file or an E2B(R3) XML file, and wherein the plurality of field codes are E2B(R2) codes or E2B(R3) codes.

13. The method of claim 12, wherein the general case data further includes a plurality of field code terms in the second language, wherein each field code term is associated with a field code of the plurality of field codes, and wherein the method further comprises:

translating, by the processing circuit, the plurality of field code terms into the first language based on the case localization data; and providing, by the processing circuit, the plurality of field code terms to the user computing device to enable display on the user interface.

14. The method of claim 11, wherein the adverse event data includes date data and wherein determining the general case data comprises:

determining, by the processing circuit, the date data of the adverse event data is in a first date format; and modifying, by the processing circuit, the date data to be in a second date format based on the case localization data, wherein the first case dataset further includes the date data in the second format.

15. The method of claim 11, wherein the user interface further includes a plurality of duolingual text fields, wherein each duolingual text field comprises a first language text field including at least a portion of the text data in the first language and a second language text field adjacent the first language text field, and wherein the text data in the second language is received via the second language text fields of the plurality of duolingual text fields.

16. The method of claim 11, further comprising:

determining, by the processing circuit, the general case data is missing a portion of the general case data;

determining, by the processing circuit, a plurality of general case data fields based on the general case information and the missing portion of the general case data;

providing, by the network interface circuit, the plurality of general case fields to the user computing device to enable display on the user interface; and receiving, by the processing circuit, the missing portion of the general case data from the user computing device, wherein the missing portion of the general case data is received via one or more of the plurality of general case data fields of the user interface.

17. The method of claim 16, wherein the plurality of general case data fields and the plurality of regional case fields include a plurality of labels, and wherein the method further comprises:

receiving, by the network interface circuit, a display language from the user computing device;

translating, by the processing circuit, the plurality of labels to the display language; and providing, by the network interface circuit, the plurality of labels in the display language to the user computing device to enable display on the user interface.

18. The method of claim 1, wherein the regional case data includes at least one of: a PMDA reporting category, an initial date for reporting, a text overview of the case, a text analysis of infections, or a text list of actions to be taken.

19. The method of claim 6, wherein the at least one regional case field includes a PMDA reporting category field.

20. The method of claim 11, wherein the plurality of regional case fields includes an NMPA report classification field and a pregnancy data text field.

* * * * *